United States Patent [19]

Kaneshige et al.

[11] Patent Number: 5,743,766
[45] Date of Patent: Apr. 28, 1998

[54] SIM CAR CONNECTOR

[75] Inventors: Akira Kaneshige, Musashino; Hiroyuki Fujii, Yokohama, both of Japan

[73] Assignee: Molex Incorporated, Lisle, Ill.

[21] Appl. No.: 623,204

[22] Filed: Mar. 28, 1996

[30] Foreign Application Priority Data

May 18, 1995 [JP] Japan ................................ 7-144098

[51] Int. Cl.6 .................................................. G06K 7/00
[52] U.S. Cl. ........................... 439/630; 235/441; 235/482
[58] Field of Search ........................ 439/630, 325–328, 439/260; 235/441, 482

[56] References Cited

U.S. PATENT DOCUMENTS

| | | | |
|---|---|---|---|
| 4,602,351 | 7/1986 | Shimamura et al. | 365/52 |
| 4,774,399 | 9/1988 | Fujita et al. | 235/441 |
| 4,976,630 | 12/1990 | Schuder et al. | 439/260 |
| 5,151,847 | 9/1992 | Rautenberg | 439/260 |
| 5,320,552 | 6/1994 | Reichardt et al. | 439/331 |
| 5,336,877 | 8/1994 | Raab et al. | 235/475 |
| 5,369,259 | 11/1994 | Bleier et al. | 235/441 |
| 5,550,361 | 8/1996 | Huis et al. | 235/441 |

FOREIGN PATENT DOCUMENTS

| | | |
|---|---|---|
| 0 647 918 A1 | 10/1994 | European Pat. Off. |
| 6-338971 | 12/1994 | Japan. |

*Primary Examiner*—Gary P. Paumen
*Attorney, Agent, or Firm*—Stacey E. Caldwell

[57] ABSTRACT

Disclosed is an improved two-piece SIM card-receiving connector comprising a housing having terminals mounted therein, and a card holder having a card-receiving section for receiving the SIM card. The card holder is slidably mounted to the housing by way of ledges formed on side edges of the card holder guided within channels formed along both sides of the housing. The housing includes a lock lever having a latch projection extending therefrom. The latch projection engages a corresponding recess formed on the card holder to lock the card holder and housing in an assembled condition. The two-piece construction allows the housing to be easily and automatically assembled to an underlying circuit board, and the sliding assembly of the card holder to the housing provides "self-cleaning" of the terminals during both assembly and removal of the card holder to the housing.

6 Claims, 3 Drawing Sheets

SIM CAR CONNECTOR

FIELD OF THE INVENTION

The present invention relates to a card-receiving connector for electrically connecting an electronic circuit of a SIM card with the circuitry of an underlying printed circuit board.

BACKGROUND OF THE INVENTION

Card-receiving connectors or card readers are commonly known for connecting circuits on the cards with other circuits such as those included in mobile telephones or in printed circuit boards. Miniature circuit cards, such as "SIM" (Subscriber Identity Module) cards, are examples of such cards and are used in mobile telephones for electronic functions such as verification of the identity of the individual users.

Examples of prior art card-receiving connectors are disclosed in U.S. Pat. Nos. 5,320,552 and 5,336,877. Such card-receiving connectors generally comprise a housing having connection terminals mounted therein. The connection terminals have contact portions which extend above the surface of the housing to contact corresponding contacts on a card. A card holder is hinged or pivotally mounted to the housing and opens and closes relative to the housing. A card, such as a "SIM" card, is inserted into a card-receiving section formed in the card holder. The card holder is then closed so that the card contacts are forced against the terminal contact portions on the housing for effecting an electrical connection between the circuitry of the card and the connector.

The prior art card connectors described above, however, have some deficiencies. First, due to the hinged construction of the card holder with respect to the housing, the process of mounting the housing to the printed circuit board is done with the card holder hinged thereto, which makes automated assembly of the connector very difficult. Second, in order to assure a reliable connection between the card and the connector, the connector should be equipped with a lock mechanism to hold the card contacts against the terminal contact portions. Such a lock mechanism would further complicate the construction of the connector.

Third, the electrical connection between the card contacts and the terminal contact portions may degrade over time from contamination of the terminal contact portions and/or from the formation of oxide films due to exposure of the contact portions. This is particularly problematic when the electrical connection between the card and the connector is made by a simple contact-and-release action, as opposed to a wiping or slide action which would clean the contacts and remove any oxide films that develop over time.

SUMMARY OF THE INVENTION

It is therefore an object of the present invention to provide a two-piece card-receiving connector which is adapted for automated assembly, which has a lock mechanism for holding the card to the connector contacts and which is designed such that a wiping or cleaning effect on the terminal contact portions is achieved during use of the connector.

In view of the above, the present invention provides an improved card-receiving connector which includes a housing and a card holder as separate components wherein the card holder is slidably mounted to and held within the housing.

According to the present invention, a card-receiving connector comprises a housing having terminals mounted therein, and a card holder having a card-receiving section formed in a bottom surface thereof. The card holder is slidably mounted to the housing by way of side edges on the card holder which fit within oppositely formed channels extending along both sides of the housing.

According to one embodiment of the invention, the housing has a manually releasable lock lever formed on an upper front surface which has a latch projection extending therefrom. Upon mounting or assembling the card holder to the housing, the latch projection of the lock lever engages a corresponding recess in the card-receiving section of the card holder. Therefore, when the card holder is mounted within the housing, a reliable connection is ensured between the card contacts and the terminals of the housing.

The card holder includes projections formed on side edges thereof which engage channels in the housing. The projections are formed at different longitudinal locations along the side edges of the card holder. The housing includes corresponding cut-out portions on the walls of said channels for receiving the projections of the card holder. This facilitates mounting of the card holder and ensures proper orientation thereof.

In addition, the card holder has a card biasing feature formed on one side of the card-receiving section for frictionally engaging a side edge of the card to hold the card within the card holder.

Since the housing and the card holder are separately molded components, the housing alone is assembled to an underlying printed circuit board, thereby facilitating assembly of the connector to the board and allowing use of automated assembly during processing the connector to the board. Furthermore, since the card holder is slidably mounted to the housing, the card wipes over the contact portions of the housing terminals during mounting of the card holder, thereby keeping the contact portions of the terminals clean and free of contaminations such as oxide layers that could otherwise affect the integrity of the electrical connection over time.

BRIEF DESCRIPTION OF THE DRAWINGS

The invention, together with its objects and the advantages thereof, may be best understood by reference to the following description taken in conjunction with the accompanying drawings in which.

DETAILED DESCRIPTION OF THE PREFERRED EMBODIMENT

Figure 1:
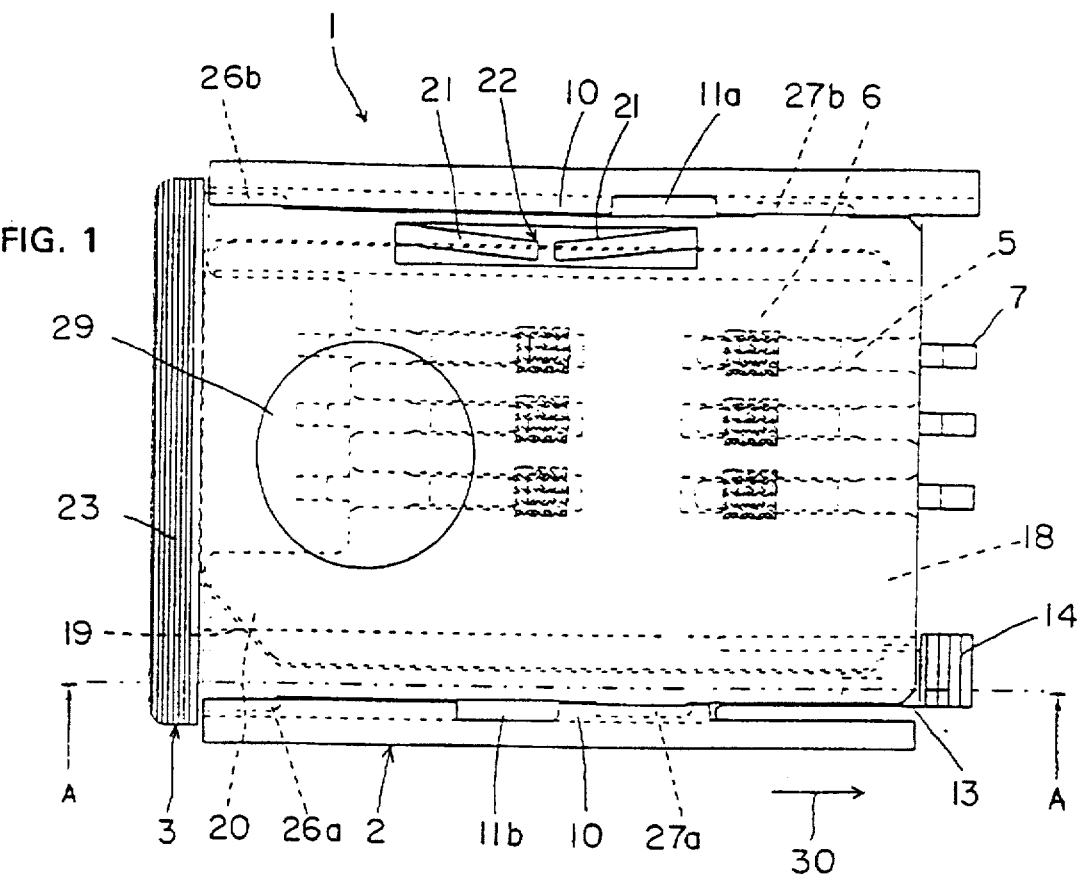
FIG. 1 is a plan view of a card-receiving connector according to an embodiment of the present invention.
Figure 2:
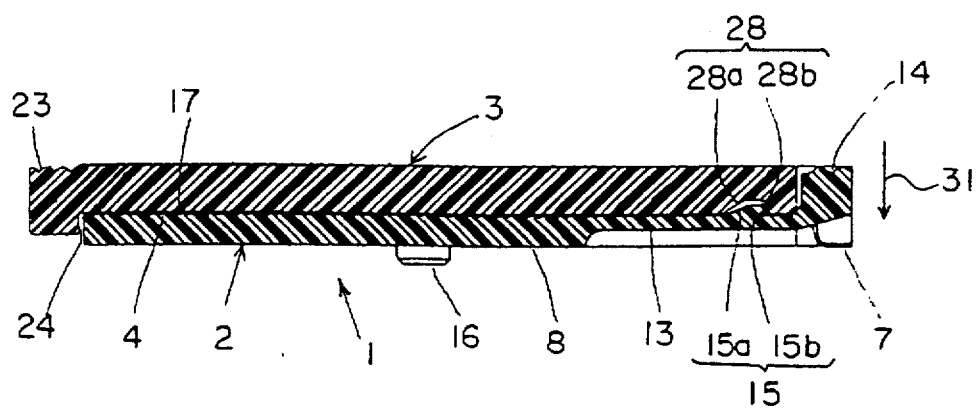
FIG. 2 is a cross-sectional view taken along a line A—A in FIG. 1.
Figure 3:
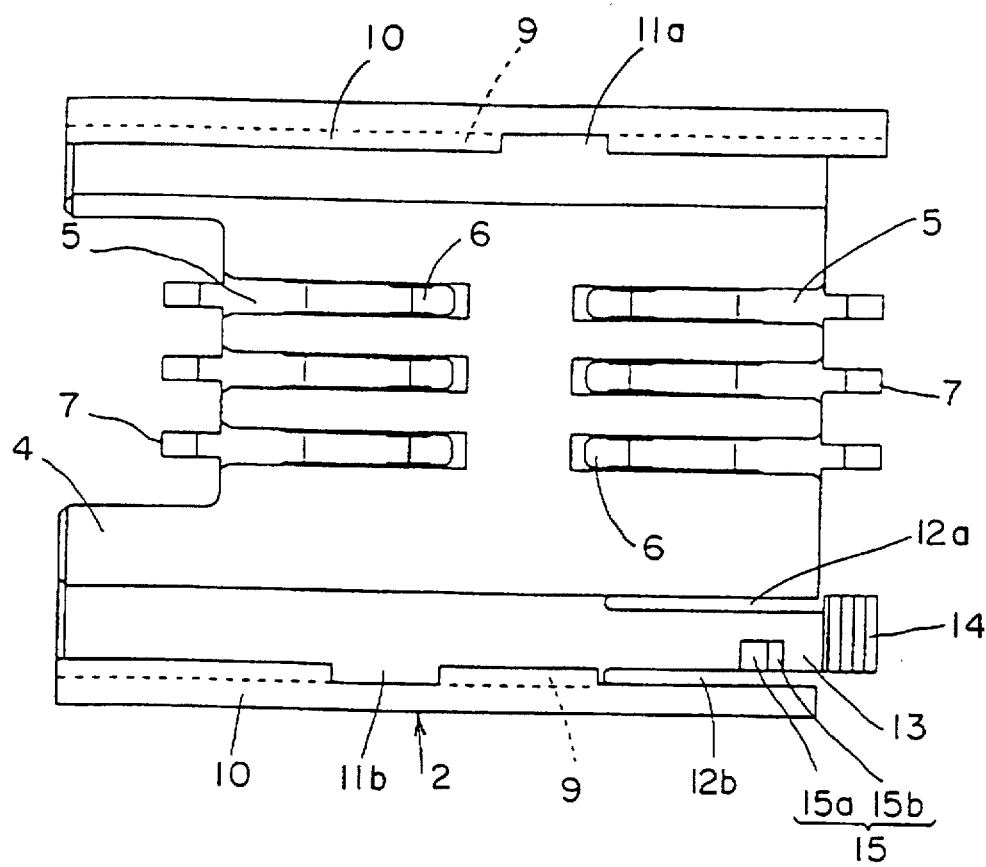
FIG. 3 is a plan view of the housing of the card-receiving connector.
Figure 4:
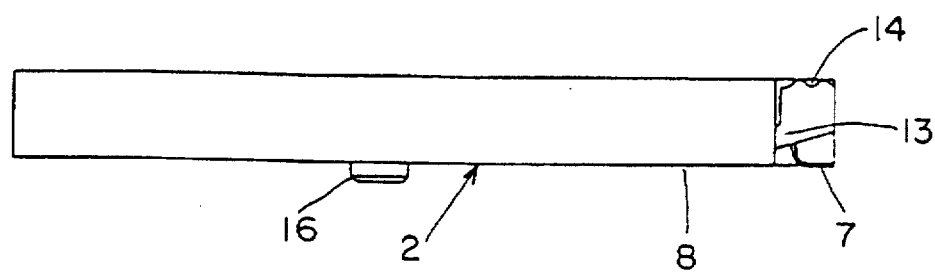
FIG. 4 is a side view of the housing.
Figure 5:
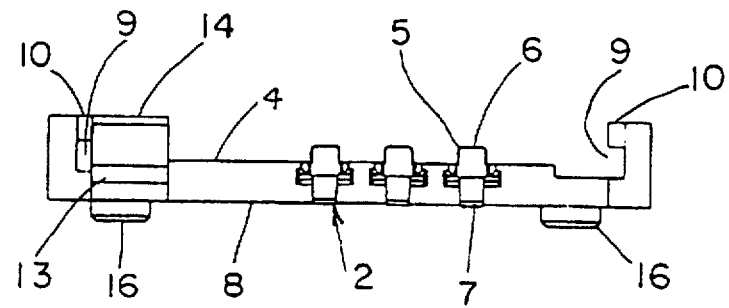
FIG. 5 is a front view of the housing.
Figure 6:
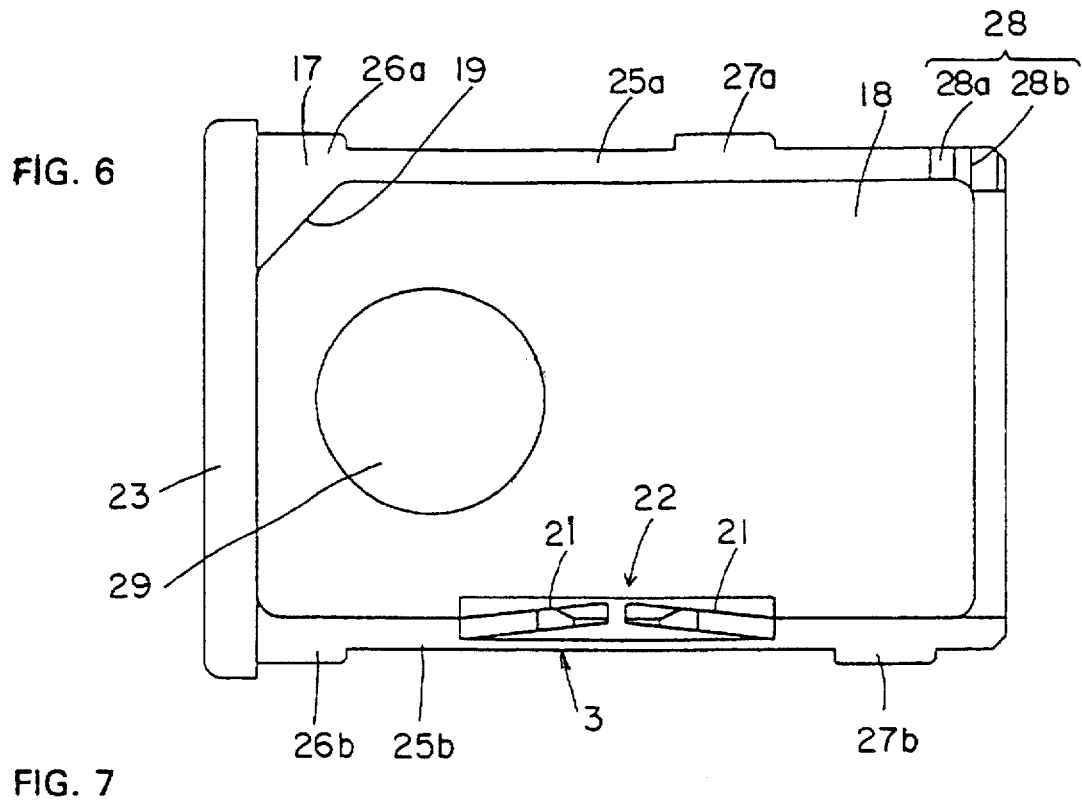
FIG. 6 is a plan view of a card holder of the card-receiving connector.
Figure 7:
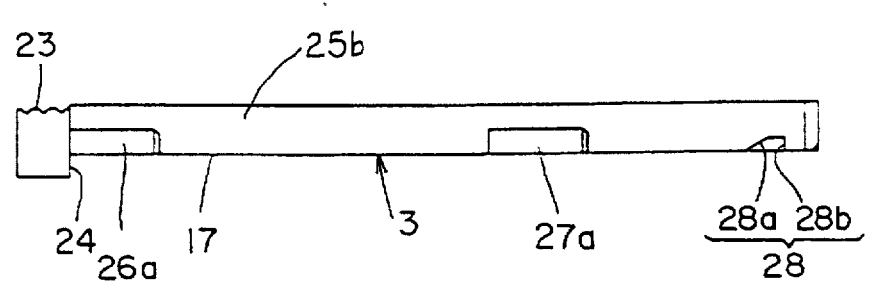
FIG. 7 is a side view of the card holder.
Figure 8:
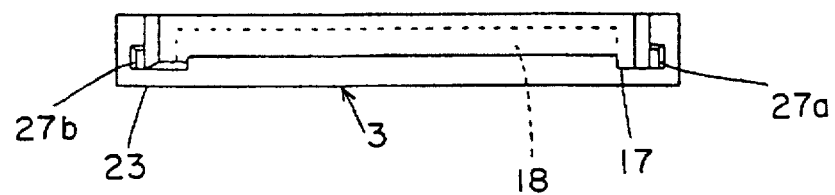
FIG. 8 is a front view of the card holder.

FIGS. 1 and 2 show a card-receiving connector 1 for a SIM module or SIM card according to the present invention which includes a card holder 3 mounted to a housing 2. FIGS. 3, 4 and 5 show the housing 2 of the connector; and FIGS. 6, 7 and 8 show the card holder 3. Housing 2 and card holder 3 of card connector 1 are separate components independently molded of insulative plastic material.

Referring to FIGS. 3, 4 and 5, housing 2 is in the form of a generally flat rectangular body having six cantilever beam-style terminals 5 mounted therein. Each terminal 5 has a contact portion 6 at one end which projects slightly above an upper surface 4 of the housing body; and a tail 7 at the other end which is substantially flush with a board-mounting surface 8 of housing 2. Channels 9 formed in walls 10 extend from upper surface 4 along both sides of the housing body and straddle the array of terminals 5 so that card holder 3 may be slidably mounted within the housing. Both channels include cut-out portions 11a and 11b formed on walls 10. In addition, a pair of slots 12a and 12b extend through the body of housing 2 near one of the channels and parallel thereto and a cantilever-type lock lever 13 is formed between slots 12a and 12b. The lock lever has an end portion 14 for manual actuation thereof, and a latch projection 15 formed on a surface of lever 13 at a position near end portion 14. Peg members 16 are cylindrical projections extending from board-mounting surface 8 of housing 2 for insertion into corresponding holes of a printed circuit board on which housing 2 is to be mounted.

Referring to FIGS. 6, 7 and 8, card holder 3 is in the form of a generally flat rectangular body 17 and has a recess or card-receiving section 18 formed in a bottom surface thereof for receiving a SIM card. Card-receiving section 18 is substantially rectangular in shape and has a diagonal key 19 at the corner for ensuring proper orientation of the card 20 (indicated by a broken line in FIG. 1). A card biasing feature 22 is formed in one side wall of card-receiving section 18 and includes two inwardly slanting cantilevered fingers 21 as shown in FIG. 6 to bias or hold the SIM card within the card-receiving section.

As viewed in FIG. 6, card holder 3 has a forward end at the right-hand side and a rearward end at the left-hand side and includes a stepped portion 24 at the left-hand side. In addition, card holder 3 has a first set of outwardly extending ledges 26a and 26b formed on side edges 25a and 25b, respectively, adjacent and normal to a grasping portion 23. The card holder also includes a second set of outwardly extending ledges 27a and 27b formed on opposite side edges 25a and 25b, respectively, forward of ledges 26a and 26b. Ledge 27b is longitudinally shown forward of ledge 27a to correspond to the locations of cutout portions 11a and 11b of housing 2, as discussed in more detail below. Each of the ledges 26a, 26, 27a and 27b has a height approximately equal to one half the height of side edges 25a and 25b and is slightly less than the depth of channels 9 of housing 2. Therefore, upon mounting the card holder in housing 2, ledges 26a, 26b, 27a and 27b slidably fit within channels 9.

A recess 28 formed on side edge 25a on a lower surface of body 17 adjacent the forward end thereof is adapted to provide a latching surface for projection 15 of housing 2. To this end, recess 28 includes an inclined surface 28a and a vertical surface 28b which correspond to a slant surface 15a and a vertical surface 15b of latch projection 15. Furthermore, a circular through-hole 29 is provided near grasping portion 23 of card-receiving section 18 for removing the SIM card from the card holder.

Cut-out portions 11a and 11b formed in channel walls 10 of housing 2 have a length substantially equal to or slightly greater than the length of ledges 27a and 27b formed on side edges 25a and 25b of card holder 3 so that cut-out portions 11a and 11b receive ledges 27a and 27b therethrough. More specifically, the cut-out portion 11a receives ledge 27b therethrough and cut-out portion 11b receives ledge 27a therethrough.

In order to assemble card-receiving connector 1 to a printed circuit board, housing 2, being separately molded from card holder 3, is first processed alone to the circuit board. Therefore, tails 7 of connection terminals 5 on housing 2 are positioned on connection pads of the printed circuit board and soldered thereto.

Thereafter, in order to electrically connect a card 20, such as a "SIM" card, to housing 2 (already assembled to the circuit board), card 20 is put in card-receiving section 18 of card holder 3 and card holder 3 is then mounted to housing 2. More specifically, card 20 is held in the card-receiving section 18 by card-biasing feature 22 (FIG. 6) so it does not fall out during assembly of the card holder to the board-mounted housing.

In order to assemble card holder 3 to housing 2, card holder 3 is positioned above housing 2 so that a lower surface of body 17 of the card holder faces upper surface 4 of housing 2. Next, card holder 3 is aligned with respect to housing 2 by positioning projections 27a and 27b of card holder 3 over cut-out portions 11b and 11a of housing 2, respectively. As a result, body 17 of card holder 3 comes in contact with upper surface 4 of housing 2. Thereafter, card holder 3 is slidably moved in a direction indicated by arrow 30 (FIG. 1). This movement of card holder 3 causes engagement of ledges 26a, 26b, 27a and 27b into and with channels 9. When card holder 3 is in place, latch projection 15 formed on lock lever 13 on upper surface 4 of housing 2 becomes engaged with or latches behind recess 28 of body 17 of card holder 3, and stepped portion 23 on the rear end of card holder 3 abuts an end surface of housing 2.

It is noted that lock lever 13 is displaced under a downward force applied to slant surface 15a during the slide movement of card holder 3, but is restored when latch projection 15 latches within recess 28. Accordingly, vertical surface 15b of latch projection 15 engages vertical surface 28b of recess 28, thereby locking card holder 3 within housing 2.

The sliding assembly of card holder 3 into housing 2 causes the surface including the contacts, of card 20 to wipe over contact portions 6 of terminals 5 until the card contacts and contact portions are electrically connected to each other at the completion of the slide movement of the card holder. Therefore contact portions 6 of connection terminals 5 are continuously subjected to a cleaning effect each time a card 20 mounted within the connector.

In order to remove card 20 from the connector, end portion 14 of lock lever 13 is depressed in the direction indicated by arrow 31 (FIG. 2) to release latch projection 15 from recess 28. Thereafter, card holder 3 is slidably moved in the opposite direction to remove the card from housing 2. At such time, contact portions 6 of connection terminals 5 are again subjected to wiping due to the sliding motion in reverse.

The present invention, therefore, provides an improved card-receiving connector which is easily assembled to a printed circuit board and is capable of automated assembly; and which is "self-cleaning" due to the slide movement of the holder and card with respect to the housing and contact portions.

Furthermore, the card holder is held within the housing by the interengagement of a latch projection and a recess. Therefore, wear due to the repeated insertion and removal of a card where only a friction-fit retention of the card and card holder is used is avoided.

We claim:

1. A two-piece card-receiving connector for electrically connecting the circuitry of a card to the circuitry of a printed circuit board comprising:

a housing for mounting on the circuit board and having terminals mounted therein, the terminals adapted to make electrical contact with contacts on the card, and a card holder having a card-receiving recess formed on a lower surface thereof for holding the card within the card holder, wherein said card holder is adapted to be slidably mounted in said housing by way of side edges of the card holder which slide within channels formed along both sides of the housing, and wherein said housing includes a manually releasable cantilever lock lever formed on an upper surface of one end thereof having a latch projection integrally formed therewith adapted to engage a corresponding recess in the card holder to prevent the card holder from sliding out of the housing and to removably lock the card holder within the housing to ensure a reliable connection between the card contacts and the terminals of the housing.

2. A card-receiving connector as set forth in claim 1, wherein the manually releasable cantilever lock lever is integrally molded with the housing and movable in a direction perpendicular to the direction the card holder is slidably mounted in the housing, whereby, when the lock lever is depressed away from the card holder, the card holder can be slidably removed from the housing.

3. A card-receiving connector as set forth in claim 1, wherein said card holder further includes outwardly projecting ledges integrally formed on the side edges thereof at different longitudinal locations along the card holder and adapted to retain the card holder within said channels of the housing after the card holder is slidably mounted in the housing.

4. A card-receiving connector as set forth in claim 3, wherein said housing channels include cut-out portions adapted to receive the outwardly projecting ledges of the card holder to facilitate mounting of the card holder within the housing.

5. A card-receiving connector as set forth in claim 4, wherein said cut-out portions of the housing channels correspond to the length and shape of corresponding outwardly projecting ledges of the card holder to ensure proper orientation of the card holder within the housing.

6. A card-receiving connector as set forth in claim 2, wherein the card holder further includes a grasping portion at an end opposite the manually releasable cantilever lock lever and a stepped portion on the lower side of the card holder for abutting an end of the housing.

* * * * *